Dec. 16, 1958    M. D. WELSH ET AL    2,864,465
BRAKE FOR BABY CARRIAGE
Filed July 6, 1953    2 Sheets-Sheet 2
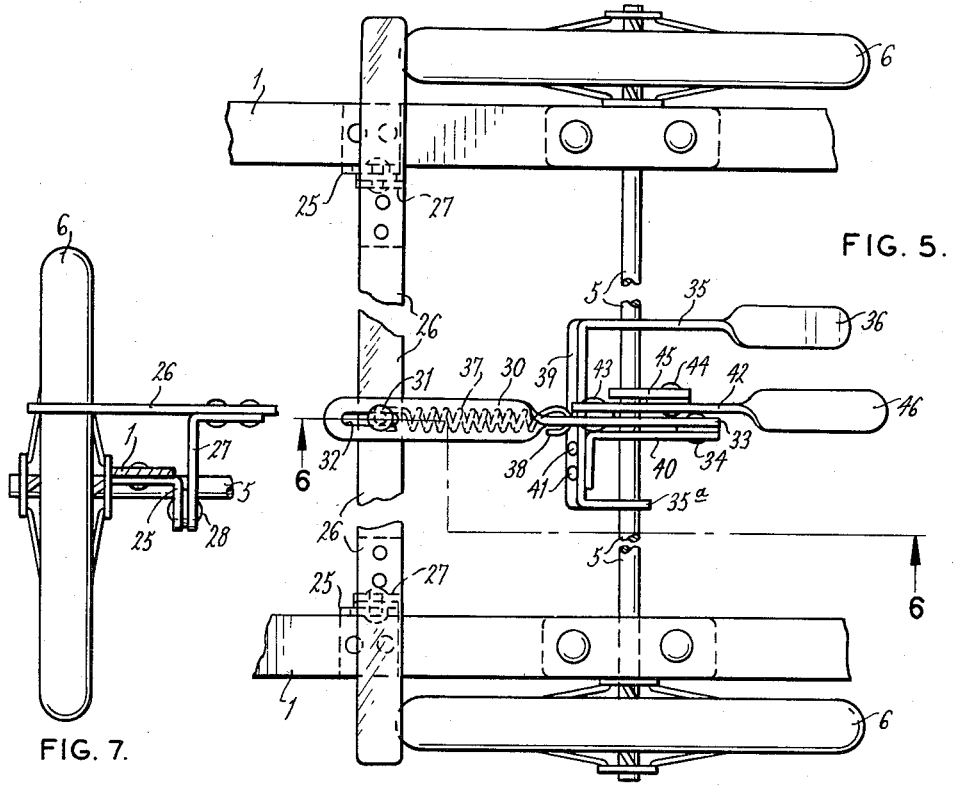
FIG. 5.
FIG. 7.
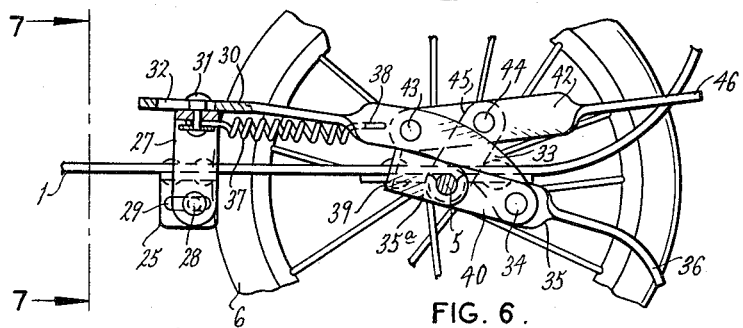
FIG. 6.
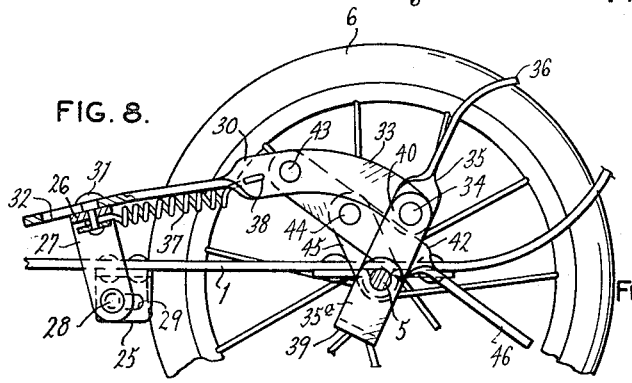
FIG. 8.
INVENTORS
MATILDA D. WELSH
FREDERICK EDWARD MILLER
BY
ATTORNEY

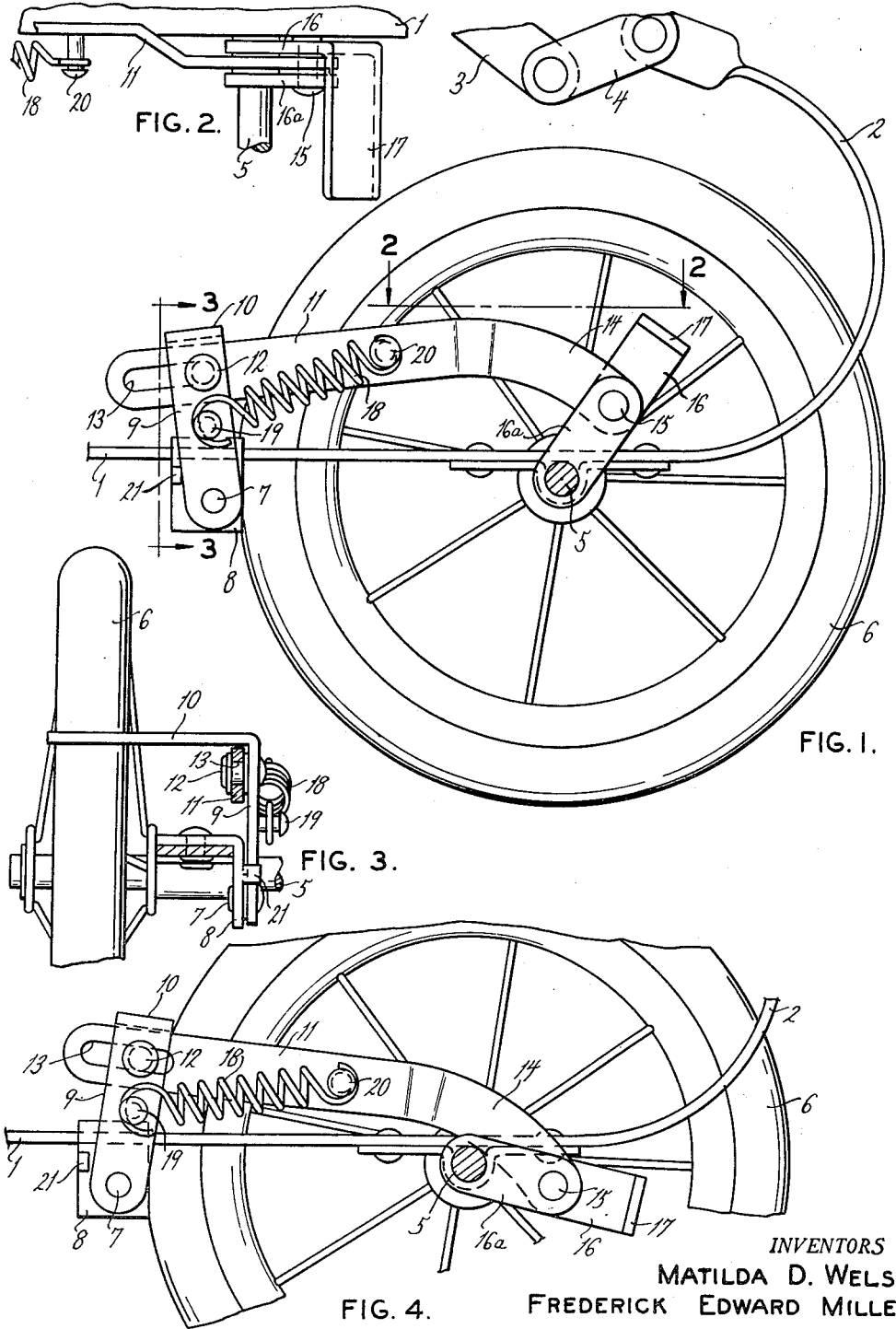

United States Patent Office 2,864,465
Patented Dec. 16, 1958

2,864,465

BRAKE FOR BABY CARRIAGE

Matilda D. Welsh, St. Louis County, and Frederick Edward Miller, St. Louis, Mo.; said Miller assignor to said Welsh Application July 6, 1953, Serial No. 366,132

7 Claims. (Cl. 188—20)

This invention pertains to baby carriages, and particularly to a brake for such carriages which may be set to keep the carriage from rolling.

An object of this invention is to provide a brake structure which will adapt itself to variations in the diameter of the carriage wheel to which it is applied.

Another object is to provide foot-operated means for releasing the brake operable by downward pressure so that the sole of the shoe is engaged instead of the upper portion in order to avoid marring such upper surface of the shoe.

Generally stated, this invention provides a brake shoe on a member movable on the chassis of the carriage together with a toggle for setting the brake. The shoe member has a shiftable pivotal connection with the toggle link so that the shoe may shift to different positions when engaging different sized wheels. Spring means are provided to urge the shoe toward the wheel to provide braking pressure.

In a modified form an additional pedal is provided, arranged so that upon depression thereof the brake which has previously been set will be released. Thus two depressible pedals are provided, one for setting the brake and the other for releasing it.

A preferred embodiment of this invention is illustrated in the accompanying drawing, in which Fig. 1 is a fragmentary view in elevation of a portion of the chassis of a baby carriage, as seen from inside the rear wheel, showing a brake embodying this invention mounted thereon;

Fig. 2 is a detail plan view taken about on line 2—2 of Fig. 1;

Fig. 3 is a detail section on line 3—3 of Fig. 1;

Fig. 4 is a view similar to Fig. 1 but showing the brake set;

Fig. 5 is a fragmentary plan view of the rear part of the chassis showing an embodiment in which the brake is applied to both rear wheels;

Fig. 6 is a section on line 6—6 of Fig. 5;

Fig. 7 is a section on line 7—7 of Fig. 6, and

Fig. 8 is a view similar to Fig. 6, showing the brake released.

Referring to the drawing, 1 designates one of the side members of the chassis of a baby carriage, said member having its end portion bent upward as at 2. The body structure, represented at 3, is connected by a link 4 to the portion 2. An axle 5, mounted on the chassis 1, has mounted thereon a road wheel 6.

Pivoted at 7 on a bracket 8 on the chassis is a brake shoe member 9, having a bent-over portion 10 providing a brake shoe engageable with the wheel 6. The member 9 is connected to a toggle link 11 by a pin 12 passing through a slot 13 in said link. The pin 12 thus provides a pivotal connection between said member and said link, which connection is shiftable along the slot 13.

The other end of the link 11 has a bent portion 14 curving downward and pivoted at 15 to a toggle arm 16, which, in turn, is pivoted on the axle 5. In the structure shown the arm 16 is double, having an auxiliary arm 16a extending between the axle 5 and the pin 15, the link 11 being between said arms. The arm 16 has a bent-over portion 17 providing a manipulating element for operating the brake.

A tension spring 18 is connected at one end to a pin 19 on the intermediate portion of the member 9 and at the other end to a pin 20 on the intermediate portion of the link 11. The tension of this spring controls the movements of the member 9, the link 11 and the arm 16. When the parts are in the position of Fig. 1, the action of the spring is, first, to shift the pivot 12 to the end of the slot 13 nearest to the wheel 6; second, to urge the member 9 and the link 11 toward each other, scissors fashion, on the pivot 12; and third, this latter tendency, restrained by the connections at 7 and 5, causes the member 9 to rotate on the pivot 7 in the counter-clockwise direction as seen in Fig. 1. This movement is limited by a stop 21 on the bracket 8 with the shoe 10 clear of the wheel.

When the brake is to be set the operator moves the element 17 downward. This causes the arm 16 to pivot on the axle 5, drawing the link 11 to the rear and with it the member 9 until the shoe 10 contacts the rim of the wheel. This stops the member 9 but the link 11 may move on, stretching the spring 18, while the slot 13 slides on the pin 12. This movement continues until the arm 16 swings around its pivot 5 far enough to carry the pivot 15 past the line of centers of the axle 5 and the pivot 7, to the position shown in Fig. 4, wherein the toggle formed by the link 11 and the arm 16 is locked under tension of the spring 18. In this position the spring 18 not only locks the toggle but also provides the braking pressure of the shoe 10 against the rim of the wheel.

It will be noted that as the brake is set the shoe 10 makes contact with the wheel rim, and as the movement continues the pivot 12 shifts along the slot 13, in the direction toward the end of the slot, until the toggle is finally locked. This shift of the pivot will, therefore, accommodate a variation in the wheel diameter up to the limit set by the length of the slot 13. Such variation in wheel diameter is a condition encountered in the manufacture of these carriages, as wheels obtained in different consignments or from different suppliers, though nominally of the same size, often vary by a substantial fraction of an inch. In the same way, wheels which may have become undersize by wear may still be safely held by a substantial brake pressure.

The embodiment shown in Figures 5 to 8 inclusive is arranged to apply the brakes to both rear wheels 6, and is also provided with a device for releasing the brake. On the side members 1 of the chassis, brackets 25 are mounted. These are similar to the bracket 8 of the embodiment of Figures 1 to 4. A cross-bar 26 extends across the chassis and its ends provide brake shoe members adapted to engage the wheels 6. This cross-bar has fixed thereto a pair of arms 27, one on each side of the chassis, which arms are connected to the brackets 25, each by a pivot pin 28 shiftable fore and aft in a slot 29 in the bracket 25. Thus the bar 26 with its arms 27 provides a brake shoe member having a shiftable pivotal connection with the chassis.

The mechanism for setting the brake is similar to that disclosed in Figures 1 to 4, and includes a link 30 connected to the cross-bar 26 by a pivot pin 31 fixed to said cross-bar and shiftable fore and aft in a slot 32 in the link 30. This link 30 corresponds to the link 11 shown in Figure 1 and is also formed with a downward-bent portion 33 pivoted at 34 to a toggle arm 35, which in turn is pivoted on the axle 5. The arm 35 has a rearward extension forming a manipulating element 36. A spring 37 similar to the spring 18 is connected to the pin 31 and to the link 30 at 38. This spring acts in the same manner as described for the spring 18, to hold the parts normally in the position shown in Figure 8 with the brake shoe members clear of the wheels. In order to set the brake, the operator presses down on the element 36 with the foot. This moves the parts in a manner similar to that described for Figures 1 and 4 until the toggle locks in the position shown in Fig. 6. Since the pins 28 are shiftable in the slots 29 and the braking tension of the spring 37 is applied at the middle of the bar 26, said bar may adjust itself pivotally on the pin 31 so as to apply equal pressure to the wheels 6. As may be sure from Figure 7, ample clearance is allowed between the arms 27, the brackets 25, and the pins 28 to allow pivoting of the bar 26. Only a slight amount of pivoting is necessary.

The toggle arm 35 may be in the form of a U-shaped member as shown in Fig. 5, having a cross-bar 39 and a second pivot arm 35a also pivoted on the shaft 5. The link 30 may be connected to a third arm 40 secured to the cross-bar 39 by rivets 41 or otherwise. The entire structure, including the arms 35, 35a, the cross-bar 39, and the arm 40, all move as a rigid structure pivoted on the axle 5. As will be seen from Fig. 6, the cross-bar 39 is also positioned so that it is engaged by the link 30 when the toggle is locked so as to act as a stop limiting the movement of the parts in the locking direction.

Means for releasing the brake after having been set to the position of Fig. 6, include a lever 42 pivoted at 43 to the link 30 and at 44 to another link 45, which latter link is also pivoted on the axle 5. The lever 42 is provided at its end with a manipulating element 46. As may be seen from Fig. 6, downward pressure on the element 46 will cause the lever 42 to pivot on the pin 44, thereby lifting the pin 43 and the link 30. As soon as this action has lifted the link 30 sufficiently to cause the pivot pin 34 to pass the dead center of the locking device, the spring will cause the parts to return to the position of Figure 8. While the brake can be released by lifting the element 36, since this is an upward movement, it would have to be done by placing the foot below said element in order to lift. This may cause the action to mar the upper of the shoe. To avoid this necessity, the element 46 is arranged so that downward pressure thereon by the sole of the shoe is effective to cause the release of the brakes. This release mechanism may be applied to the embodiment of Fig. 4 in the same manner as shown in Figs. 6 and 8.

It will be seen, therefore, that this invention provides a simple mechanism for providing a brake for a baby carriage. The arrangement shown in Figs. 1 to 4 is of very simple construction, and as it is applied to only one wheel, may be made very cheap, although mechanically very effective to lock the carriage against rolling. On the other hand, where it is desired to brake both wheels, the arrangement of Figs. 5 to 8 is a simple modification of the former mechanism, and provides a simple action both for setting the brake and releasing the same.

Various changes may be made in the details of construction, within the scope of the appended claims, without departing from the spirit of this invention. Parts of the invention may be used without the whole, and improvements may be added, while retaining some or all of the advantages of the invention.

We claim:

1. A brake for a baby carriage having a chassis and a road wheel thereon, comprising, a brake-shoe member pivoted on the chassis for movement against the wheel, a toggle link having a shiftable connection with said member, said pivotal connection being shiftable in the same direction as said brake shoe member during setting and releasing of said brake respectively, a toggle arm pivoted to the chassis and to said link and forming with the latter a lockable toggle, and spring means between the member and the link normally shifting said connection along said link toward the wheel, whereby movement of said toggle to locked position will move said shoe member against the wheel under tension of said spring means.

2. A brake for a baby carriage having a chassis and a road wheel thereon, comprising, a brake-shoe member pivoted on the chassis for movement against the wheel, a toggle link having a pivotal connection with said member, said pivotal connection being shiftable along said link in the same direction of movement as said brake shoe member during setting and releasing of said brake respectively, to accommodate variation in the wheel diameter, a toggle arm pivoted to the chassis and to said link and forming with the latter a lockable toggle, and spring means between said member and link normally shifting said pivotal connection along said link toward the wheel, whereby movement of said toggle to locked position will move said shoe member against the wheel under tension of said spring means.

3. A brake for a baby carriage having a chassis, an axle thereon and a road wheel on said axle, comprising, a brake shoe member pivoted on the chassis for movement against the wheel tread, a toggle link having a pivotal connection with said member, said pivotal connection being shiftable along said link in the same direction of movement as said brake shoe member during setting and releasing of said brake respectively, to accommodate variation in the wheel diameter, a toggle arm pivoted on said axle and pivotally connected to said link and forming with said link a lockable toggle, and spring means between the member and link normally shifting said pivotal connection along said link toward said wheel, whereby movement of said toggle to locked position will move said shoe member against the wheel tread under tension of said spring means.

4. A brake for a baby carriage having a chassis, an axle thereon and a road wheel on said axle, comprising, a brake shoe member pivoted on the chassis for movement against the wheel tread, a toggle link having a pivotal connection with said member, said pivotal connection being shiftable along said link in the same direction of movement as said brake shoe member during setting and releasing of said brake respectively, to accommodate variation in the wheel diameter, a toggle arm pivoted on said axle and pivotally connected to said link and forming with said link a lockable toggle, and a tension spring connected between intermediate points of said member and said link, whereby movement of said toggle to locked position will move said shoe member against the wheel tread under tension of said spring means.

5. A brake for a baby carriage having a chassis, and a road wheel thereon, comprising, a brake-shoe member pivoted on the chassis for movement against the wheel, a toggle link having a pivotal connection with said member, said pivotal connection being shiftable along said link in the same direction of movement as said brake shoe member during setting and releasing of said brake respectively, to accommodate variation in the wheel diameter, a toggle arm pivoted on the chassis and pivotally connected to said link and forming with said link a lockable toggle, said arm having a pedal depressible to lock said toggle, spring means between said member and link normally shifting said pivotal connection along with link toward the wheel, whereby movement of said toggle to locked position will move said shoe member against the wheel under tension of said spring means, a second link pivoted on the chassis, a release lever pivoted to said second link and having a pedal, and a connection between said lever and said link whereby depression of said pedal will cause said lever to move said link to break the toggle.

6. A brake for a baby carriage having a chassis and a pair of road wheels thereon, comprising, a brake-shoe member extending across the chassis and having pivotal connections therewith for movement against said wheels, said pivotal connections being shiftable toward and away from said wheels and having the same direction of movement as said brake-shoe means during setting and releasing of said brake respectively, a toggle pivoted on the chassis and having a shiftable connection with said member to move the same into engagement with said wheels when said toggle moves to locked position, and spring means between said toggle and said member normally shifting said pivotal and shiftable connections toward said wheels, whereby movement of said toggle to locked position will move said member against both wheels though of different sizes.

7. A brake for a baby carriage having a chassis and a pair of road wheels thereon, comprising, a brake-shoe member extending across the chassis and having a pivotal connection with each side thereof for movement against said wheels, said connections being shiftable toward and away from said wheels and having the same direction of movement as said brake-shoe means during setting and releasing of said brake respectively, a toggle link having a shiftable connection with the middle portion of said member, a toggle arm pivoted to the chassis and to said link and forming therewith a lockable toggle, and spring means between said toggle and said member normally shifting all said shiftable connections toward said wheels, whereby movement of said toggle to locked position will move said shoe member against both said wheels though of different sizes.

References Cited in the file of this patent

UNITED STATES PATENTS

| | | |
|---|---|---|
| 494,910 | Wells | Apr. 4, 1893 |
| 601,872 | Fraser | Apr. 5, 1898 |
| 608,865 | Jones | Aug. 9, 1898 |
| 754,510 | Snyder | Mar. 15, 1904 |
| 784,443 | Starbard | Mar. 7, 1905 |
| 1,269,095 | Lambson | June 11, 1918 |
| 1,281,415 | Potter | Oct. 15, 1918 |
| 1,633,001 | Cuppett | June 21, 1927 |
| 1,715,555 | Jackson | June 4, 1929 |
| 1,915,286 | Bleustein | June 27, 1933 |
| 2,249,860 | Sheldrick | July 22, 1941 |
| 2,738,034 | Levine | Mar. 13, 1956 |